US006970811B1

(12) United States Patent
Boerger et al.

(10) Patent No.: US 6,970,811 B1
(45) Date of Patent: Nov. 29, 2005

(54) HARDWARE MODELING OF LED RELATIVE BRIGHTNESS

(75) Inventors: Paul A. Boerger, Loveland, CO (US); Keith Forrest, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/532,398

(22) Filed: Mar. 22, 2000

(51) Int. Cl.[7] .......... G06F 17/10

(52) U.S. Cl. .......... 703/2; 703/13; 703/14; 700/30; 700/31; 702/1; 702/40

(58) Field of Search .......... 703/13, 19, 2; 250/215, 216

(56) References Cited

U.S. PATENT DOCUMENTS

| | | | | | |
|---|---|---|---|---|---|
| 5,016,027 | A | | 5/1991 | Uebbing | |
| 5,065,007 | A | * | 11/1991 | Tanaka | 250/215 |
| 5,471,052 | A | * | 11/1995 | Ryczek | 250/226 |
| 5,589,741 | A | * | 12/1996 | Terman et al. | 315/360 |
| 5,803,579 | A | * | 9/1998 | Turnbull et al. | 362/516 |
| 5,894,341 | A | * | 4/1999 | Nishi et al. | 355/68 |
| 6,078,732 | A | * | 6/2000 | Beretta | 358/1.9 |
| 6,087,846 | A | * | 7/2000 | Alvord et al. | 324/767 |
| 6,127,783 | A | * | 10/2000 | Pashley et al. | 315/149 |
| 6,130,700 | A | * | 10/2000 | Murayama et al. | 347/240 |
| 6,180,415 | B1 | * | 1/2001 | Schultz et al. | 436/518 |
| 6,342,945 | B1 | * | 1/2002 | Allen et al. | 356/73.1 |
| 6,486,945 | B1 | * | 11/2002 | Haerle et al. | 356/218 |

FOREIGN PATENT DOCUMENTS

WO WO 01/27910 A1 * 4/2001 .......... G09G 3/32

OTHER PUBLICATIONS

"Solid State Devices and Applications", F. Driscoll, pp. 370-380, Prentice-Hall Inc. 1975.*

"Microelectronic Circuits", A. S. Sedra, Holt, Rinehart, and Winston Inc. pp. 193-194, 1987.*

"The Investigation of CCD Cameras and Image Processing Techniques for the Large Adaptive Reflector CCD Camera Based surface Measurement System", B Carlson, Image Processing for LAR surface Measurement, Apr. 12, 1999.*

* cited by examiner

*Primary Examiner*—Jean R. Homere
*Assistant Examiner*—Fred Ferris
(74) *Attorney, Agent, or Firm*—Alexander J. Neudeck

(57) ABSTRACT

Via simple electronic circuitry, an analog voltage that tracks the LED light output is produced. This analog voltage is read by an A/D converter to ascertain an approximate relative light output of the LED so that light output compensation can be quickly calculated. A resistor-capacitor circuit is used to approximate the behavior of the LED light output. The output voltage from this circuit is sampled and used along with a sensed ambient temperature to adjust the exposure time of an image capture system.

14 Claims, 2 Drawing Sheets

HARDWARE MODELING OF LED RELATIVE BRIGHTNESS

CROSS REFERENCE TO RELATED APPLICATIONS

A related copending United States patent applications commonly owned by the assignee of the present document and incorporated by reference in its entirety into this document is being filed in the United States Patent and Trademark Office on or about the same day as the present application. This related application is Ser. No. 10/684,017, and is titled "SOFTWARE DETERMINATION OF LED BRIGHTNESS AND EXPOSURE."

FIELD OF THE INVENTION

The invention relates generally to precision control of an exposure and more particularly to modeling the light output of a light emitting diode (LED) to maintain a constant exposure as the light output of an array of LED's changes.

BACKGROUND OF THE INVENTION

High quality image capture such, as grayscale and color imaging, needs a precision light source. Because of their size, price, reliability, and other qualities, light emitting diodes (LED's) may be chosen as the light source for image capture. Unfortunately, the light output of an LED changes with junction temperature and age. Because LED's heat up when they are on, one of the factors that determines the junction temperature of an LED, and hence its light output, is the amount of time, and duty cycle that the LED is on. One way to compensate for at least part of this variation is to use a light calibration strip. A light calibration strip may be used with a search algorithm to set the illumination levels prior to image capture. A disadvantage of this method is that part of the image capture array is used to sense the calibration strip. This decreases the width or area that is captured at any given moment. Another disadvantage is that this method does not account for changes in the junction temperature during image capture.

Accordingly, there is a need in the art for an illumination compensation method and apparatus that does not utilize a light calibration strip.

SUMMARY OF THE INVENTION

An embodiment of the invention provides, via simple electronic circuitry, an analog voltage that tracks the LED light output. This analog voltage is read to ascertain an approximate relative light output of the LED so that an exposure compensation can be quickly calculated. Since the analog voltage is generated via simple electronic circuitry, it is inexpensive to implement and does not require the calculation of difficult exponential equations that would require a relatively long time to calculate on an associated processor. In the preferred embodiment, a resistor-capacitor circuit is used to approximate the behavior of the LED light output. The output voltage from this circuit is sampled and used along with a sensed ambient temperature to adjust the capture exposure.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENTS

Figure 1:
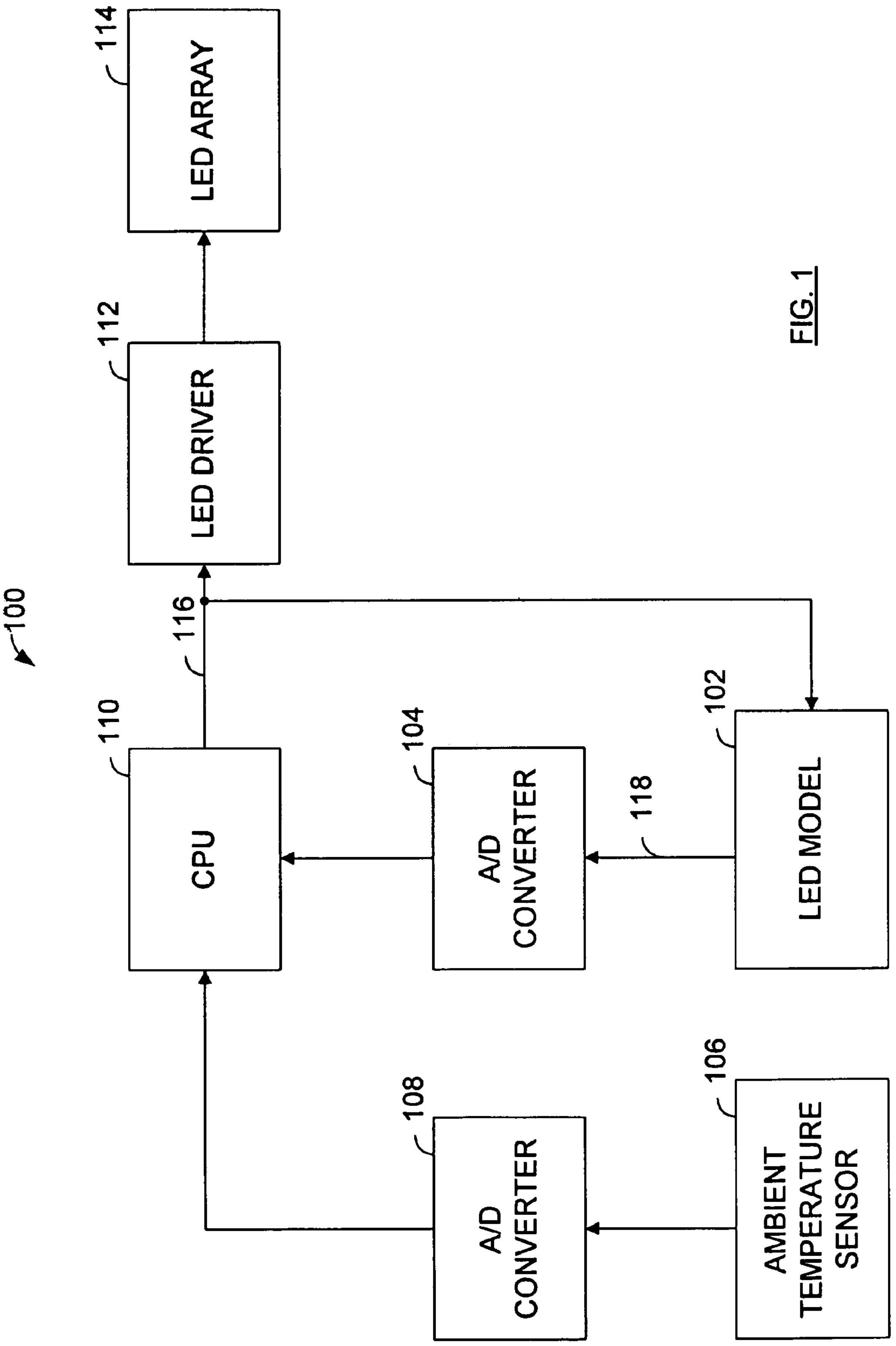
FIG. 1 is a block diagram of a capture exposure system.

FIG. 1 is a block diagram of a capture exposure system 100. Central processing unit (CPU) 110 sends illumination control signal 116 to LED driver 112 and LED model 102. LED driver 112 is coupled to LED array 114. LED array 114 provides illumination for capturing an image. LED model provides analog voltage 118 that tracks the light output of the LED's in LED array 114. Analog voltage 118 is input to analog-to-digital converter (A/D converter) 104. The output of A/D converter 104 is read by CPU 110. This capture exposure system also has an ambient temperature sensor 106. The output of ambient temperature sensor 106 is read by A/D converter 104 and passed to CPU 110. CPU 110 uses these two values to calculate an exposure time for an image capture.

The light output of an LED can be described with the following equation using an experimentally derived figure-of-merit $T_0$:

$$RLOP(T) \equiv e^{\left[\frac{-(T-T_c)}{T_0}\right]} \quad \text{Equation 1}$$

where RLOP(T) is the relative light output when the p-n junction is at temperature T. $T_c$ is the reference temperature that the relative light output is reference to. In other words, $RLOP(T_c)=1$. $T_0$ is determined by measuring the relative light output at numerous junction temperatures and then applying an exponential fit to determine the $T_0$ for that particular device. The above equation describes relative light output in terms of the p-n junction temperature. Unfortunately, this temperature depends on a number of other factors including the ambient temperature, the on-off history of the LED, the forward voltage, forward current, LED efficiency, and the thermal time constant of the LED. The on-off history of the LED is particularly important because it determines the starting temperature of the LED each time it is turned on or turned off. When an LED is on, the junction temperature follows a heating curve that resembles:

$$T_j = (T_\infty - T_{on})\left[1 - e^{\frac{-t}{\tau}}\right] + T_{on} \quad \text{Equation 2}$$

where $T_{on}$ is the starting temperature of the junction when the LED is turned on, $T_\infty$ is the steady-state junction temperature that the junction would reach after the LED is on a long time and T is the thermal time constant of the LED. When an LED is off, the junction temperature follows a cooling curve that resembles:

$$T_j = (T_{off} - T_a)e^{\frac{-t}{\tau}} + T_a \quad \text{Equation 3}$$

where $T_{off}$ is the starting temperature of the junction when the LED is turned off, $T_a$ is the ambient air temperature and $\tau$ is the thermal time constant of the LED.

Substituting Equation 2 into Equation 1 to produce an equation that relates relative light output to on time, the result has the form:

$$RLOP(t_{on})=K_1 e^{K_2 e^{(-t/\tau)}} \quad \text{Equation 4}$$

where:

$$K_1 = e^{\left[\frac{T_c - T_\infty}{T_0}\right]} \quad \text{Equation 5}$$

$$K_2 = \left[\frac{T_\infty - T_{on}}{T_0}\right]. \quad \text{Equation 6}$$

Note that since $T_\infty$ is the steady state value for the junction temperature, in normal operation $T_\infty \geqq T_{on}$ so that $K_2$ will always be greater than or equal to zero. Accordingly, as on time, $t_{on}$, goes from zero to infinity, the RLOP decreases from $K_1 \cdot \exp(K_2)$ to $K_1$ along a curve that has the shape of an exponential to a positive exponential to a negative x (i.e. exp(exp(−t))). Also note that if constant power is input to the LED, $T_\infty$ will be a fixed amount above the ambient air temperature $T_a$. This allows $K_1$ and $K_2$ to be expressed in terms of the ambient air temperature, $T_a$, and another constant, $T_\Delta$. $T_\Delta$ is the temperature rise above ambient that the LED junction is at for a given power input, thermal resistance, and efficiency. Accordingly, $K_1$ and $K_2$ may be expressed as:

$$K_1 = e^{\left[\frac{T_c - T_a - T_\Delta}{T_0}\right]} = e^{\frac{-T_\Delta}{T_0}} \cdot e^{\left[\frac{T_c - T_a}{T_0}\right]} \quad \text{Equation 7}$$

$$K_2 = \left[\frac{T_a + T_\Delta - T_{on}}{T_0}\right] \quad \text{Equation 8}$$

Substituting equation 3 into equation 1 to produce an equation that relates relative light output to off time, the result has the same form as Equation 4 but different constants:

$$RLOP(t_{off})=K_3 e^{K_4 e^{(-t/\tau)}} \quad \text{Equation 9}$$

where:

$$K_3 = e^{\left[\frac{T_c - T_a}{T_0}\right]} \quad \text{Equation 10}$$

$$K_4 = \left[\frac{T_a - T_{off}}{T_0}\right]. \quad \text{Equation 11}$$

Note that Ta is the steady state value for the junction temperature if the LED is off for a very long time and that in normal operation $T_{off} \geqq T_a$. This means that $K_4$ will always be less than or equal to zero. Accordingly, as off time, $t_{off}$, goes from zero to infinity, the RLOP increases from $K_3 \cdot \exp(K_4)$ (which is less or equal to $K_3$ since $K_{4b \leqq 0}$) to $K_3$ along a curve that has the shape of an exponential to a negative exponential to a negative x (i.e. exp(−exp(−t))).

Equations 3 and 9 both have the form:

$$RLOP(t)=K_a e^{K_b e^{(-t/\tau)}} \quad \text{Equation 12}$$

The Taylor series expansion of Equation 12 is:

$$K_a e^{K_b e^{(-t/\tau)}} = K_a\left[1 + K_b e^{(-t/\tau)} + \frac{K_b^2 e^{(-2t/\tau)}}{2!} + \frac{K_b^3 e^{(-3t/\tau)}}{3!} + \cdots\right] \quad \text{Equation 13}$$

Since the exponent is negative in all the $e^{(\ldots)}$ terms of the Taylor series expansion, they rapidly diminish in magnitude when $t>\tau$ or $|K_b|<1$. Therefore, when either of these conditions is true, Equation 12 can be approximated by:

$$RLOP(t)=K_a e^{K_b e^{(-t/\tau)}} \approx K_a[1+K_b e^{(-t/\tau)}] \quad \text{Equation 14}$$

Applying this same approximation to Equations 3 and 9 yields:

$$RLOP(t_{on})=K_1 e^{K_2 e^{(-t/\tau)}} \approx K_a[1+K_b e^{(-t/\tau)}]=K_1 L_1 K_2 e^{(-t/\tau)} \quad \text{Equation 15}$$

$$RLOP(t_{off})=K_3 e^{K_4 e^{(-t/\tau)}} \approx K_a[1+K_b e^{(-t/\tau)}]=K_3=K_3 K_4 e^{(-t/\tau)} \quad \text{Equation 16}$$

From the form of Equation 15, it can be seen that the relative light output while the LED is on will decrease in approximately an exponential fashion eventually approaching a limit value of $K_1$. The amount of decrease is set by the initial temperature of the junction, $T_{on}$, each time the LED is turned on. $T_{on}$ is embedding in $K_2$. Likewise, it can be seen from the form of Equation 16 that the relative light output when the LED is next turned on increases along a curve similar to $1-e^x$ while the LED is off (because $K_4$ is always negative) eventually approaching a limit value of $K_3$. The amount of increase is set by the initial temperature of the junction, $T_{off}$, each time the LED is turned off. $T_{off}$ is embedded in $K_4$. Finally, it is known that the relative light output does not change discontinuously at the instant the LED is turned on or off. Therefore, the initial conditions in $K_2$ and $K_4$ must be such that Equation 15 and Equation 16 are equal at each on-to-off and off-to-on transition.

The curves followed by Equations 15 and 16 have the same shape as the voltage across a capacitor being charged and discharged through a resistor. Likewise, a the voltage across a capacitor being charged and discharged does not change discontinuously during charging-to-discharging and discharging-to-charging transitions. Given these two conditions, the changes in the relative light output as an LED is switched on and off are modeled by this invention as a resistor-capacitor (RC) or inductor-resistor (LR) circuit. To model the relative light output with an RC circuit, the capacitor is charged through the resistor when the LED is off and discharged through the resistor when the LED is on. This RC model is shown in FIG. 2.

Figure 2:
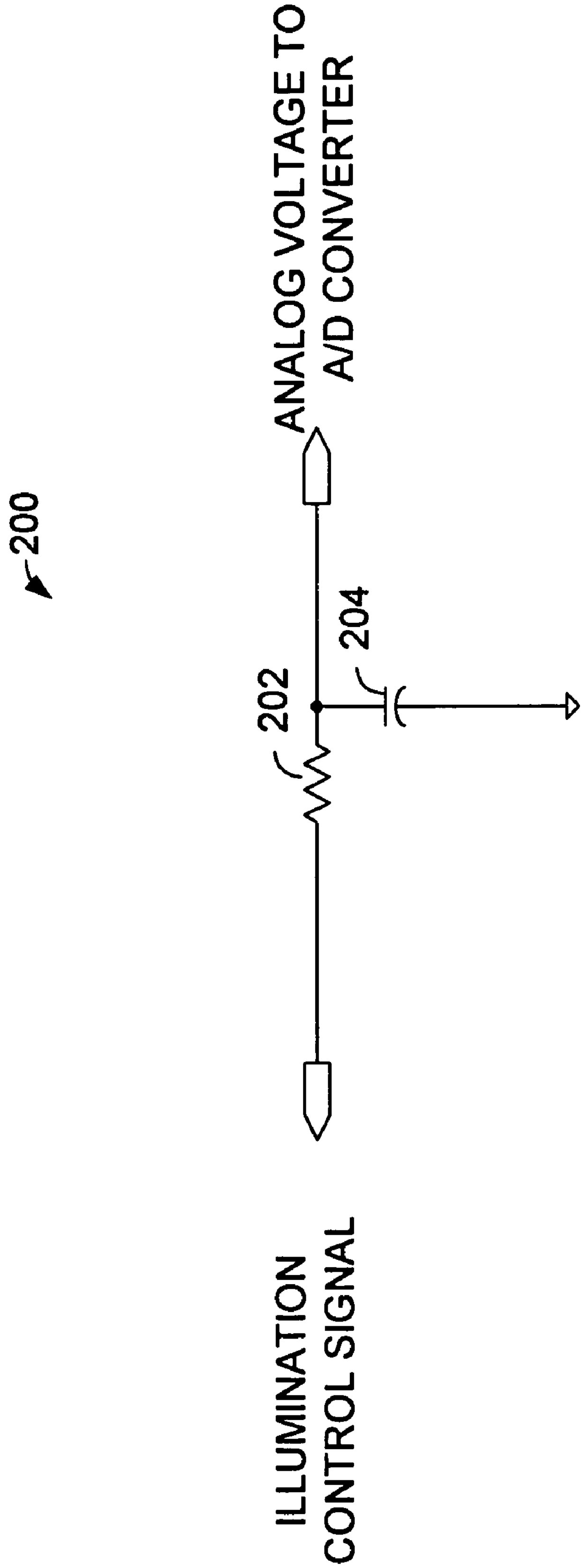
FIG. 2 is a schematic diagram of an RC circuit that may be used to model LED relative light output.

In FIG. 2, illumination control signal 116 is connected to a first terminal of resistor 202. The second terminal of resistor 202 is connected to the model output. The model output is analog voltage 118 that goes to the input of A/D converter 104. The second terminal of resistor 202 is also connected to the first terminal of capacitor 204. The second terminal of capacitor 204 is connected to the negative supply rail or some other reference voltage.

Illumination control signal 116 discharges capacitor 204 through resistor 202 when illumination control signal 116 is in a state that turns LED array 114 on. In FIG. 2, this is shown as a direct connection. However, depending on the polarity of the illumination control signal 116 a logical inversion or buffering may be necessary before it is applied to resistor 202.

To model the relative light output, an embodiment of the invention first charges the RC circuit to a known voltage level. This sets the initial condition of the model. This initial condition would normally be higher than the eventual discharged condition of the RC circuit because it is assumed that the LED junction is at the ambient air temperature and hence the relative light output is at its greatest level. Accordingly, the initial voltage across the capacitor of the RC circuit is at its greatest level when the relative light output is expected to be at its greatest level. During operation of the model, whenever the LED is on, the capacitor of the RC circuit is discharged through the resistor and whenever the LED is off, the capacitor of the RC circuit is charged through the resistor. This functions such that the voltage across the capacitor of the RC circuit tracks the change in relative light output from the relative light output when the LED junction was at the ambient temperature.

In an embodiment of the invention, the values for the resistor and capacitor are determined experimentally. A voltage level is arbitrarily chosen for the initial condition of the RC circuit that represents the light output when the LED brightest. To simplify design, this can be the positive power supply voltage. Likewise, a voltage level is arbitrarily chosen for the discharged state of the RC circuit that represents the light output when the LED is dimmest. To simplify design, this can be when the capacitor is fully discharged. The range of relative light output values that these two extremes represent is determined by the thermal properties of the entire illumination system and its packaging so this range is determined experimentally in the preferred embodiment.

When capture exposure system 100 is about to start an exposure it samples the voltage across capacitor 204 with A/D converter 104. This gives the system a modeled relative brightness. This modeled relative brightness is used along with a sampled ambient temperature to determine an exposure. The mapping of ambient temperature and modeled relative brightness to actual relative brightness performed by a lookup table in the preferred embodiment. The values of this lookup table may be determined experimentally or they may be calculated.

To calculate the values of this lookup table, Equation 1 is used as a starting point.

$$RLOP(T) \equiv e^{\left[\frac{-(T-T_c)}{T_0}\right]} \qquad \text{Equation 1}$$

Re-writing T, which is the junction temperature, in terms of $T_a$, $T_\Delta$ and a difference from maximum temperature factor, $\Delta_T$, produces:

$$T=T_\infty-\Delta_T=T_a+T_\Delta-\Delta_T \qquad \text{Equation 17}$$

substituting Equation 17 into Equation 1 produces:

$$RLOP(T) \equiv e^{\left[\frac{-(T_a+T_\Delta-\Delta_T-T_c)}{T_0}\right]}. \qquad \text{Equation 18}$$

Since all the factors in Equation 18 except Ta are constant for different ambient temperatures, then the relative light output at an ambient temperature $T_{a1}$ can be related to the relative light output at an ambient temperature $T_{a2}$ for the same $\Delta_T$ by:

$$LUT(T_{a2}-T_{a1}) = \frac{RLOP(T_{a2}+T_\Delta-\Delta_T-T_c)}{RLOP(T_{a1}+T_\Delta-\Delta_T-T_c)} = e^{T_{a2}-T_{a1}} \qquad \text{Equation 19}$$

Equation 19 can be used to construct a look-up table that produces a factor that is multiplied by the modeled relative brightness. The result of this multiplication produces actual relative brightness. This actual relative brightness is then used to calculate a capture exposure. One simple method of calculating the capture exposure is to divide the relative brightness by an exposure constant to produce an exposure time. Since the capture exposure is the total amount of light output by the LED integrated over time, this simple method produces a reasonably constant capture exposure over the range of LED brightness.

In the preferred embodiment, the capture exposure is adjusted by turning the LED array on for the capture exposure time. However, other methods of adjusting the capture exposure, such as opening and closing a shutter, may be used.

From the foregoing it will be appreciated that the capture exposure system and LED relative brightness model provided by the invention offers the advantages of simplicity and avoids the calculation of difficult exponential equations or continues integration by the control microprocessor. Furthermore, the system may be configured to a variety of thermal parameters or adapted to a variety of exposure control mechanisms.

Although several specific embodiments of the invention have been described and illustrated, the invention is not to be limited to the specific forms or arrangements of parts so described and illustrated. The invention is limited only by the claims.

What is claimed is:

1. An article of manufacture comprising a program storage medium having computer readable program code means embodied therein for causing the adjustment of an exposure, the computer readable program code means in said article of manufacture comprising;

computer readable program code means for causing a computer to read an indication of the brightness of an illumination source from a model;

computer readable program code means for causing said computer to adjust said exposure based on said indication of said brightness of said illumination source.

2. The article of manufacture of claim 1 further comprising:

computer readable program code means for causing said computer to turn on and turn off said illumination source.

3. The article of manufacture of claim 2 further comprising:

computer readable program code means for causing said computer to indicate to said model the on times and off times of said illumination source.

4. The article of manufacture of claim 3 further comprising:

computer readable program code means for causing said computer to obtain an indication of an ambient temperature; and computer readable program code means for causing said computer to adjust said exposure based on said indication of said ambient temperature.

5. The article of manufacture of claim 4 wherein said Illumination source is at least one light emitting diode.

6. The article of manufacture of claim 5 wherein said model is a series resistor-capacitor circuit and said indication of said brightness of said illumination source is obtained from the voltage across said capacitor.

7. The article of manufacture of claim 5 wherein said model is a series resistor-inductor circuit.

8. An image capture device, comprising:

illumination means;

modeling means, said modeling means producing a modeling means output that is indicative of the relative brightness of said illumination means; and exposure adjustment means for changing an exposure to compensate for changes in said relative brightness of said illumination means as indicated by said modeling means output.

9. The image capture device of claim 8 wherein said modeling means has a modeling means input and said modeling means input is an indication of the on times and the off times of said illumination means.

10. The image capture device of claim 9, further comprising:

ambient temperature sensor means for producing a sensed ambient temperature wherein said exposure is also changed to compensate for said sensed ambient temperature.

11. The image capture device of claim 10 wherein said illumination means is at least one light emitting diode.

12. The image capture device of claim 11 wherein said modeling means comprises at least a capacitor and a resistor.

13. The image capture device of claim 11 wherein said modeling means comprises at least an inductor and a resistor.

14. The image capture device of claim 11 wherein said exposure is adjusted by changing said on times of said illumination source.

* * * * *

UNITED STATES PATENT AND TRADEMARK OFFICE
CERTIFICATE OF CORRECTION

PATENT NO. : 6,970,811 B1
APPLICATION NO. : 09/532398
DATED : November 29, 2005
INVENTOR(S) : Paul A. Boerger et al.

It is certified that error appears in the above-identified patent and that said Letters Patent is hereby corrected as shown below:

In column 2, line 59, delete "T" and insert -- $\tau$ --, therefor.

In column 3, line 64, delete "Ta" and insert -- $T_a$ --, therefor.

In column 4, line 2, delete "$K_{4b\leq 0}$" and insert -- $K_4 \leq 0$ --, therefor.

In column 4, line 26 (Equation 15), delete "$\approx K_a[1+K_b e^{(-t/\tau)}]=K_1 L_1 K_2 e^{(-t/\tau)}$" and insert -- $\approx K_1[1+K_2 e^{(-t/\tau)}]=K_1+K_1 K_2 e^{(-t/\tau)}$ --, therefor.

In column 4, lines 27-28 (Equation 16), delete "$\approx K_a[1+K_b e^{(-t/\tau)}]=K_3=K_3 K_4 e^{(-t/\tau)}$" and insert -- $\approx K_3[1+K_4 e^{(-t/\tau)}]=K_3+K_3 K_4 e^{(-t/\tau)}$ --, therefor.

In column 6, line 6, delete "Ta" and insert -- $T_a$ --, therefor.

In column 6, line 51, in Claim 1, delete "comprising;" and insert -- comprising: --, therefor.

In column 7, line 10, in Claim 5, delete "Illumination" and insert -- illumination --, therefor.

Signed and Sealed this
Seventeenth Day of May, 2011

David J. Kappos
*Director of the United States Patent and Trademark Office*